United States Patent [19]

Say et al.

[11] 4,180,548

[45] Dec. 25, 1979

[54] PROCESS FOR SELECTIVE REMOVAL OF CYCLIC UREA FROM HINDERED AMINE GAS TREATING SOLUTION

[75] Inventors: Geoffrey R. Say; James R. Hays, Sr., both of Baton Rouge, La.; Jagannathan N. Iyengar, Morris Plains, N.J.

[73] Assignee: Exxon Research & Engineering Co., Florham Park, N.J.

[21] Appl. No.: 972,500

[22] Filed: Dec. 22, 1978

[51] Int. Cl.² .................................................. B01D 53/34
[52] U.S. Cl. .................................... 423/223; 423/228; 423/232; 423/234; 423/236; 423/243; 260/239.3 R; 544/314; 548/317
[58] Field of Search ............... 423/226, 228, 234, 229, 423/232, 236, 233, 210, 243; 260/239.3 R; 544/314; 548/317

[56] References Cited

U.S. PATENT DOCUMENTS

| | | |
|---|---|---|
| 2,497,309 | 2/1950 | Larson et al. ........................ 548/317 |
| 2,615,025 | 10/1952 | Lutz ..................................... 548/317 |
| 2,874,149 | 2/1959 | Applegarth et al. ......... 260/239.3 R |
| 4,112,050 | 9/1978 | Sartori et al. ........................ 423/223 |
| 4,112,051 | 9/1978 | Sartori et al. ........................ 423/223 |
| 4,112,052 | 9/1978 | Sartori et al. ........................ 423/228 |

Primary Examiner—Earl C. Thomas
Attorney, Agent, or Firm—Roy J. Ott

[57] ABSTRACT

A cyclic urea reaction product forms as a by-product of a hindered amine acid gas scrubbing process and results in an ultimate buildup of the material in the circulating amine scrubbing solution. The buildup of this material has a deleterious effect on acid gas removal rates and accordingly, results in inefficient acid gas removal. In the process of the present invention, the cyclic urea degradation product is removed from the circulating solution by employing a selective precipitation of the cyclic urea followed by filtration. The selective precipitation is carried out by cooling the circulating solution to a particular temperature level such that the cyclic urea comes out of solution while the other components remain in solution.

7 Claims, 1 Drawing Figure

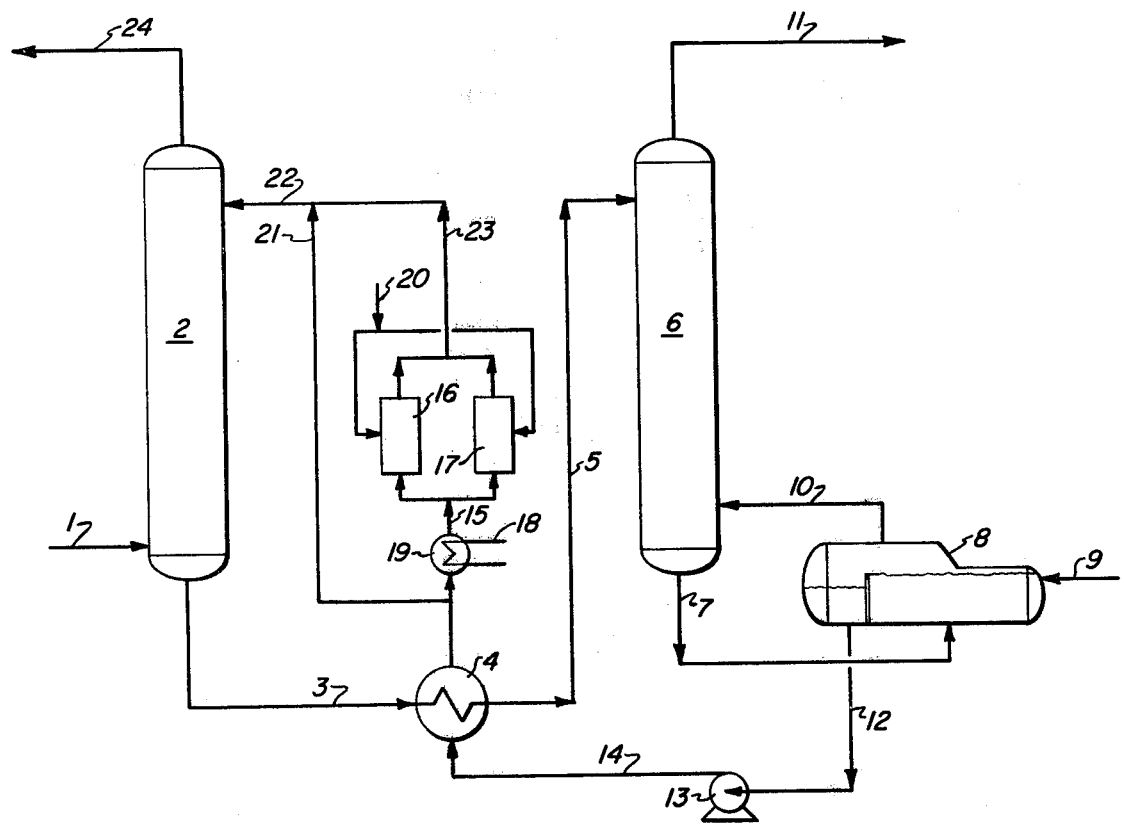

PROCESS FOR SELECTIVE REMOVAL OF CYCLIC UREA FROM HINDERED AMINE GAS TREATING SOLUTION

BACKGROUND OF THE INVENTION

1. Field of the Invention

This invention relates to a process for the removal of a cyclic urea reaction product in an amine gas treating process which involves an absorption and a regeneration system. More particularly, the invention is concerned with the selective precipitation and filtration of a cyclic urea degradation product which forms as a by-product in the feed gas scrubbing process.

2. Description of the Prior Art

It is well known in the art to treat gases and liquids, such as mixtures containing acidic gases including $CO_2$, $H_2S$, $SO_2$, $SO_3$, $CS_2$, HCN, COS and oxygen and sulfur derivatives of C1–C4 hydrocarbons with amine solutions to remove these acidic gases. Th amine usually contacts the acidic gases and liquids as an aqueous solution containing the amine in an absorber tower with the aqueous amine solution contacting the acidic fluid countercurrently.

The acidic scrubbing processes known in the art can be generally classified into three (3) categories.

The first category is generally referred to as the aqueous amine process where relatively large amounts of amine solution are employed during the absorption. This type of process is often utilized in the manufacture of $H_2$ for ammonia production where nearly complete removal of the acid gas, such as $CO_2$ is required. It is also used in those instances where an acid gas, such as $CO_2$, occurs with other acid gases or where the partial pressures of the $CO_2$ and other gases are low.

The second category is generally referred to as the aqueous base scrubbing process or "hot potash" process. In this type of process a small level of an amine is included as an activator for the aqueous base used in the scrubbing solution. This type of process is generally used where bulk removal of an acid gas, such as $CO_2$, is desired. This process also applies to situations where the $CO_2$ and feed gas pressures are high. In such processes, useful results are achieved using aqueous potassium carbonate solutions as amine activators.

A third category is generally referred to as the nonaqueous solvents process. In this process, water is a minor constituent of the scrubbing solution and the amine is dissolved in the liquid phase containing the solvent. In this process up to 50% of amine is dissolved in the liquid phase. This type of process is utilized for specialized applications where the partial pressure of $CO_2$ is extremely high and/or where many acid gases are present, e.g., COS, $CH_3SH$, and $CS_2$.

The present invention relates to a process for the selective separation of a cyclic urea degradation product which may form as a by-product of the practice of the second category of acid scrubbing process described above, namely, the aqueous base scrubbing process or "hot potash" process in which a hindered amine is used.

Many industrial processes for removal of acid gases, such as $CO_2$, use regenerable aqueous alkali scrubbing solutions, such as an amine and potassium carbonate which are continuously circulated between an absorption zone where acid gases are absorbed and a regeneration zone where they are desorbed, usually by steam-stripping. The capital cost of these acid scrubbing processes is generally controlled by the size of the absorption and regeneration towers, the size of the reboilers for generating stripping steam, and the size of the condensers, which condense spent stripping steam so that condensate may be returned to the system to maintain proper water balance. The cost of operating such scrubbing plants is generally related to the amount of heat required for the removal of a given amount of acid gas, e.g., thermal efficiency, sometimes expressed as cubic feet of acid gas removed per pound of steam consumed. Means for reducing the costs in operating these industrial processes have focused on the use of absorbing systems or combinations of chemical absorbants which will operate more efficiently and effectively in acid gas scrubbing processes using existing equipment.

It is disclosed in U.S. Pat. Nos. 4,112,050; 4,112,051 and 4,112,052 that sterically hindered amines unexpectedly improve the efficiency, effectiveness and cyclic working capacity of the acid gas scrubbing processes in all three of the above-mentioned process categories. In the case of the sterically hindered amine activated "hot potash" $CO_2$ containing acid gas scrubbing process of the invention described in U.S. Pat. No. 4,112,050, the process can be operated at a cyclic working capacity significantly greater than when diethanolamine or 1,6-hexanediamine is the amine activator used in a similar process. It is postulated that the increase in cyclic capacity observed with the sterically hindered amines is due to the instability of their carbamates. In that respect, sterically hindered amines are similar to tertiary amines. Tertiary amines are not used on a commercial scale for carbon dioxide containing acid gas scrubbing due to their low rates of absorption and desorption.

N-alkyl alkylene diamines are advantageously used as sterically hindered amine activators in the "hot pot" process. A preferred sterically hindered amine used as an activator in the "hot pot" process is N-cyclohexyl-1,3-propanediamine. This amine in the presence of an amino acid is sufficiently water soluble under absorption and desorption conditions to maintain a single phase and it also has a very high absorption capacity.

Although N-cyclohexyl-1,3-propane diamine has been found to produce excellent results as an activator in the "hot pot" treating process, one drawback in processes where it has been used is that it produces a cyclic urea product when the acid treated gas is rich with $CO_2$ and also contains $H_2S$. The cyclic urea has a deleterious effect on $CO_2$ removal rates and must be removed and replaced with fresh N-cyclohexyl-1,3-propanediamine. The makeup rate for the hindered amine has a minimal effect on the process economics; however, the cyclic urea that is formed must be selectively removed in order to be able to maintain acid gas removal performance.

The invention which is disclosed herein represents an improvement to the "hot pot" amine activated gas treating process which includes the use of a hindered amine having a tendency to form cyclic ureas under $CO_2$ rich conditions in the presence of $H_2S$. This invention discloses a processing step wherein the cyclic urea can be selectively removed from the circulating solution thereby preventing any loss in acid gas removal capabilities.

SUMMARY OF THE INVENTION

An acid gas scrubbing process providing for the selective separation of a cyclic urea reaction product which forms as a by-product during the acid gas removal, said process comprising:

(a) contacting an acid gas mixture with an aqueous solution, preferably in countercurrent flow, in an absorption zone, said aqueous solution comprising an alkaline material comprised of a basic alkali salt or metal hydroxide selected from the group consisting of alkali metal bicarbonates, carbonates, hydroxides, borates, phosphates and their mixtures, and an activator for said basic salt comprising at least one sterically hindered amine having the generic formula:

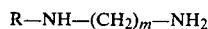

R—NH—(CH$_2$)$_m$—NH$_2$ where R is a secondary or tertiary alkyl or cycloalkyl hydrocarbon having 4-20 carbon atoms and m is 2-5, at elevated temperatures and pressures such that a cyclic urea degradation product having the generic formula:

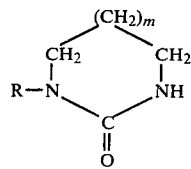

where R is a secondary or tertiary alkyl or cycloalkyl having 4-20 carbon atoms and m is 0-3; is formed and a loading of 1 to 10 SCF of acid gas per gallon of said aqueous solution is achieved;

(b) passing the acid gas rich aqueous solution produced from said step (a) to a regeneration zone operated at temperatures ranging from 200° F. to 250° F. and pressures ranging from 1 psig to 15 psig where it is contacted, preferably in countercurrent flow, with steam to strip the acid gas impurities therefrom;

(c) cooling a portion of the lean solution exiting from said regeneration zone to temperatures ranging from 120°-180° F. such that acid cyclic urea degradation product is selectively precipitated from said lean solution;

(d) passing said lean solution containing said precipitated cyclic urea degradation product to a separation zone to remove at least a portion of said cyclic urea degradation product from said lean solution.

In a preferred mode of operation, the invention comprises the additional steps of:

(e) monitoring the accumulation of said degradation product in said separation zone, preferably a filter medium, until the pressure drop across said filter medium reaches about 25 psi at which time said filter is segregated and a clean filter is substituted therefor;

(f) the segregated filter is cleaned by washing with hot water having a preferred temperature of 200°-240° F.

The degradation product forms primarily at rich conditions and gradually builds up in the solution causing a drop-off in acid gas removal capabilities for the circulating solution. When there is a buildup, it becomes necessary to remove the cyclic urea degradation product so as to maintain the enhanced acid gas removal rate for the hindered amine solution. This is accomplished in the process of the present invention by providing a slip stream from the lean solution which is cooled to a preferred temperature of 130°-160° F. and then passed over a bed of carbon or a filter medium.

The cyclic urea material was found to have unanticipated solubility properties when present in the circulating solution which contains K$_2$CO$_3$, KHCO$_3$, KHS, the sterically hindered amine and amino acid. The cyclic urea which has certain physical properties similar to those of the hindered amine was found unexpectedly to selectively come out of the solution as it was cooled from 200° F. to a temperature of about 160°-130° F. None of the other components come out of the solution at these conditions. If the solution is cooled below 135° F. the amount of cyclic urea that comes out of solution is considerable and will tend to cause plugging in the equipment. As long as the temperature is kept above 135° F. the equipment plugging tendency is minimized, and the filtration can be effectively accomplished. If the solution is cooled even further to 100° F. and below, then KHCO$_3$ will also precipitate from the solution and the process will no longer be selective. The invention disclosed herein describes the critical temperature region in which the cyclic urea can be selectively precipitated and removed without removing any of the other many components in the solution.

BRIEF DESCRIPTION OF THE DRAWING

The FIGURE is a schematic flow diagram of one embodiment of the claimed invention.

DETAILED DESCRIPTION OF THE INVENTION

The acidic components which will be removed from the gaseous mixture by the scrubbing process will preferably be selected from the group consisting of CO$_2$ alone or in combination with H$_2$S, SO$_2$, CS$_2$, HCN, COS and the oxygen and sulfur derivatives of C$_1$-C$_4$ hydrocarbons.

The alkaline material comprising basic alkali salts or metal hydroxides will be selected from the group consisting of alkali metal bicarbonates, carbonates, hydroxides, borates, phosphates and their mixtures.

The contacting of the absorbent mixture and the acid gas may take place in any suitable contacting tower. In such processes, the gaseous mixture from which the acid gases are to be removed may be brought into intimate contact with the absorbing solution using conventional control means such as a tower packed with, for example, ceramic rings or with bubble capped plates or sieve plates or a bubble reactor. In a preferred mode of practicing the invention, the absorption step is conducted by feeding the gaseous mixture into the base of the tower while the lean absorbing solution is fed into the top. The gaseous mixture, free largely from acid gases, emerges from the top. Preferably, the temperature of the absorbing solution during the absorption step is in the range from about 150° F. to about 270° F. and more preferably from 150° F. to about 250° F. Pressures may vary widely, acceptable pressures being between 5 and 2000 psig. In the desorber, the pressures will range from about 1 to 15 psig. The process can be better understood by reference to the following detailed description.

Referring to the FIGURE, sour gas is introduced via line 1 into absorption column 2 where it is contacted with the aqueous scrubbing solution introduced via line 22. The scrubbing solution is at a temperature of about 200° F. and has an amine concentration of from 1 to 10 wt. %, preferably 3 to 8 wt. %. As the absorbent liquid passes down the absorber column, acid gas impurities are absorbed.

The absorbent solution, enriched with acid gas impurities, passes out of absorber column 2 into line 3 which passes the enriched solution through heat exchanger 4 into line 5. Line 5 passes the enriched solution into the regenerator 6 where the acid gases are stripped from the solution and pass overhead through line 11. The lean solution formed in the regenerator column passes to the bottom of column 6 and out via line 7 which feeds the lean solution to reboiler 8 where it is boiled by steam entering via line 9, the acid vapors being passed via line 10 to the regenerator 6. The lean (essentially acid free) solution passes out of reboiler 8 via line 12. Line 12 passes the lean solution through pump 13 into 14. Line 14 passes the lean solution into heat exchanger 4 and some of the solution is cooled further in heat exchanger 19 with cooling water entering via line 18 down to temperatures ranging from 180° F. to 120° F., preferably 160° F. to 130° F., most preferably 150° F. to 135° F., in order to selectively precipitate the cyclic urea degradation product while keeping all other components in the solution. The solution containing the cyclic urea solids is passed into line 15 which passes it to filter element 16. The cyclic urea degradation product accumulates on the filter and is thereby selectively removed from the lean solution. When the ultimate buildup of the insoluble material on the filter causes a pressure drop of, for example, about 25 psi, a secondary filter 17 is cut in to allow continued operation of the process during the cleaning of the segregated filter.

The lean solution passes out of filter 16 via line 23 and joins with some of the other lean solution in line 21 which was not cooled by exchanger 19. These two streams combine and enter the top of the absorber. The purified gas passes out of absorber 2 via line 24. Hot water having a temperature of about 230° F. is passed via line 20 into filter element 16 in order to wash the cyclic urea from the filter and to permit its effective reuse.

DESCRIPTION OF THE PREFERRED EMBODIMENTS

The following is a summary of several examples which describe the invention.

EXAMPLE 1

A gas treating solution was prepared which had the following composition: 30 wt. % $K_2CO_3$ (with 10% as $KHCO_3$), 6.0 wt. % cyclohexyl-1,3-propane diamine, 6.1 wt. % pipecolonic acid, 56.2 wt. % water, and 1.7 wt. % cyclic urea, i.e., 1-cyclohexyl-hexahydro-2-pyrimidinone as disclosed in copending application Ser. No. 930,222, filed Aug. 2, 1978, incorporated herein. The solution at 200° F. was present as a single liquid phase. This solution was then cooled to 150° F. and was passed over a filter element which was a cotton wound element having a nominal 100$\mu$ size. The cyclic urea content was decreased from 1.7 wt. % to less than 1.0 wt. %. The filtration rate was 0.5 gpm and the filter size was a 3" diameter cylinder, 4" high with an inner opening of about 1" diameter. The filter cake was analyzed to be pure cyclic urea with none of the other solution components present. This example shows that the cyclic urea can be selectively removed by this process. It is not necessary to completely remove all the cyclic urea but just to be able to keep the concentration at a nominally low level even though it is constantly being produced within the process.

EXAMPLE 2

The gas treating solution described in Example 1 was cooled to 130° F. at which point considerably more cyclic urea came out of the solution. Operation of the process at these conditions, however, produced a somewhat inoperable condition due to the plugging tendency of the resulting precipitate. In the flowing system in which the stream is being continuously filtered such a line plugging tendency as observed above made the system somewhat inoperable. Therefore, this test indicated that for this solution cooling to below 130° F. leads to an undesired operability problem. The solids which were filtered during the test were again found to be pure cyclic urea with none of the other components of the solution present.

EXAMPLE 3

Another gas treating solution was prepared that was similar to that shown in Example 1 but which has about 30% of the $K_2CO_3$ present as $KHCO_3$. In this solution, cooling from 200° F. to 150° F. again caused the cyclic urea to selectively precipitate from the solution. As the solution was further cooled to somewhat below 100° F., it was found that the process was no longer selective in that in addition to the cyclic urea precipitating out, $KHCO_3$ also precipitated out. This test further shows the critical temperature range over which the cyclic urea selectively precipitates. If the temperature goes below about 100° F., the process is no longer selective. The filter cake in this test was found to contain substantial amounts of $KHCO_3$.

EXAMPLE 4

Another gas treating solution was prepared which had a composition similar to that shown in Example 1 except that the cyclic urea content was 1.4 wt. %. This solution was cooled to 148° F. and was filtered using a filter arrangement as described in Example 1 but with a 5$\mu$ element rather than the 100$\mu$ element. The run was carried out at 0.5 gpm and the filter cake collected was analyzed and was found to be pure cyclic urea. In this test, the run was carried out until the pressure drop across the element reached about 25 psi.

EXAMPLE 5

After completion of the run described in Example 4 the filter had a pressure drop of 25 psi due to the cyclic urea cake on the filter element. This cake was washed with 170° F. water and a second cycle was attempted in which case a run of only about 25% as long as the initial run occurred. This indicated that the washing with 170° F. water was not an effective cleaning process. The filter was then washed with 230° F. water and then another cycle was attempted. In this case, the cycle length was equivalent to that of the initial cycle on the fresh filter. Three more complete cycles were run in which the filter cake was washed with 230° F. water after a 25 psi pressure drop had built up due to the accumulation of the cyclic urea cake. In each case the amount of cyclic urea removed was the same as that with a new filter. These tests indicated an effective washing technique in which the water temperature criticality was demonstrated.

What is claimed is:

1. An acid gas scrubbing process providing for the selective removal of a cyclic urea reaction product which forms as a by-product of the acid gas removal, said process comprising:

a. contacting an acid gas mixture with an aqueous solution in an absorption zone, said aqueous solution comprising a basic alkali salt, or metal hydroxide selected from the group consisting of alkali metal bicarbonates, carbonates, hydroxides, borates, phosphates and their mixtures, and an activator for said basic salt comprising at least one sterically hindered amine having the generic formula:

where R is a secondary or tertiary alkyl or cycloalkyl hydrocarbon having 4-20 carbon atoms and m is 2-5, at elevated temperatures and pressures such that there is formed a cyclic urea reaction product having the formula:

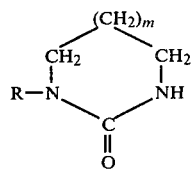

where R is a secondary or tertiary alkyl or cycloalkyl hydrocarbon having 4-20 carbon atoms and m is 0-3;

b. passing said acid gas rich aqueous solution to a regeneration zone where it is contacted with steam to remove the acid gas impurities therefrom;

c. cooling a portion of the lean solution exiting from said regeneration zone to a temperature ranging from 180-120° F. to selectively precipitate the cyclic urea from said lean solution;

d. passing said lean solution containing said precipitated cyclic urea to a separation zone to remove at least a portion of the cyclic urea from said lean solution.

2. The process of claim 1 wherein said sterically hindered amine is an N-alkyl alkylene diamine.

3. The process of claim 2 wherein said lean solution exiting from said regeneration zone is cooled to temperatures ranging from 130°-160° F.

4. The process of claim 3 wherein said sterically hindered amine is cyclohexyl-1,3-propane diamine.

5. The process of claim 4 wherein said lean solution exiting from said regeneration zone is cooled to temperatures ranging from 135°-150° F.

6. The process of claim 5 wherein said cyclic urea is removed by passing said lean solution through separation media comprising porous filters or activated carbon beds.

7. The process of claim 5 wherein the accumulation of said cyclic urea on said filter is monitored until the pressure drop across said filter reaches about 25 psi at which time said filter is segregated and a second filter is substituted therefor.

* * * * *